(12) United States Patent
Nakamura et al.

(10) Patent No.: US 8,136,199 B2
(45) Date of Patent: Mar. 20, 2012

(54) WIPER APPARATUS

(75) Inventors: Masatoshi Nakamura, Kiryu (JP); Nobuhide Hayakawa, Wako (JP)

(73) Assignees: Mitsuba Corporation, Kiryu-shi, Gunma (JP); Honda Motor Co., Ltd., Tokyo (JP)

( * ) Notice: Subject to any disclaimer, the term of this patent is extended or adjusted under 35 U.S.C. 154(b) by 482 days.

(21) Appl. No.: 12/264,567

(22) Filed: Nov. 4, 2008

(65) Prior Publication Data
US 2009/0113654 A1    May 7, 2009

(30) Foreign Application Priority Data

Nov. 5, 2007    (JP) ................................. 2007-286897

(51) Int. Cl.
*B60S 1/06* (2006.01)
*B60S 1/16* (2006.01)
(52) U.S. Cl. .................. 15/250.3; 15/250.31; 296/96.17
(58) Field of Classification Search .................. 15/250.3, 15/250.31, 250.28, 250.27, 250.14; 296/192, 296/96.15, 96.17
See application file for complete search history.

(56) References Cited

U.S. PATENT DOCUMENTS

| 2,829,394 | A | * | 4/1958 | Brigmon | 15/250.23 |
| 2,836,841 | A | * | 6/1958 | Oishei et al. | 15/250.16 |
| 2,932,842 | A | * | 4/1960 | Riester | 15/250.21 |
| 4,723,101 | A | | 2/1988 | Bauer et al. | |
| 5,157,314 | A | * | 10/1992 | Kuhbauch | 318/443 |
| 6,536,069 | B1 | * | 3/2003 | Neag et al. | 15/250.14 |
| 2004/0049875 | A1 | * | 3/2004 | Metz | 15/250.27 |
| 2006/0112510 | A1 | * | 6/2006 | Egner-Walter | 15/250.27 |
| 2006/0265832 | A1 | * | 11/2006 | Powell, Jr. | 15/250.31 |

FOREIGN PATENT DOCUMENTS

| JP | 5-105033 A | 4/1993 |
| JP | 2004-306620 A | 11/2004 |

OTHER PUBLICATIONS

Japanese Office Action for Serial No. 2007-286897 with English translation dated Sep. 1, 2009.

* cited by examiner

*Primary Examiner* — Gary Graham
(74) *Attorney, Agent, or Firm* — McCormick, Paulding & Huber LLP

(57) ABSTRACT

A location space in an engine compartment is made smaller. A DR-side wiper motor and an AS-side wiper motor are arranged within a projection area of a windshield into a cabin of a vehicle in comparison with a DR-side pivot holder and an AS-side pivot holder. Therefore, a location space of each wiper apparatus inside an engine compartment can be made smaller, and can further improve a degree of freedom of design on a vehicle side.

4 Claims, 4 Drawing Sheets

WIPER APPARATUS

CROSS-REFERENCE TO RELATED APPLICATION

The present application claims priority from Japanese Patent Application No. 2007-286897 filed on Nov. 5, 2007, the content of which is hereby incorporated by reference into this application.

TECHNICAL FIELD OF THE INVENTION

The present invention relates to a wiper apparatus for wiping off adhesive substances adhering to a vehicle windshield.

BACKGROUND OF THE INVENTION

Conventionally, on vehicles such as automobiles, a wiper apparatus for wiping off adhesive substances, such as rain, snow, and splashes from preceding vehicles, adhering to a windshield to secure visibility of a driver is provided. Among such wiper apparatuses are, for example, a so-called tandem type wiper apparatus which drives a pair of wiper arms swingably by a single wiper motor, and a so-called opposite type wiper apparatus which drives each of a pair of wiper arms swingably by a pair of wiper motors provided on a left side and a right side of the vehicle. In examples above, in the opposite type wiper apparatus which has a pair of wiper arms and a pair of wiper motors, a vehicle-side allocation space can be made small because of absence of a linking mechanism, whereby a degree of freedom of design on the vehicle side can be ultimately improved.

Known among such opposite type wiper apparatuses, for example, is a wiper apparatus described in Patent Document 1 (U.S. Pat. No. 4,723,101). The wiper apparatus described in Patent Document 1 comprises a pair of wiper shafts (pivot shafts) allocated at both end sides of and below the windshield, and a windshield wiper (wiper arm and wiper blade) is provided on each wiper shaft. Then, each wiper shaft is rotatably driven by a pair of electric motors each allocated on an opposite side of the windshield side of the relevant wiper shaft, whereby each windshield wiper is driven swingably, wiping a predetermined area over the windshield.

SUMMARY OF THE INVENTION

However, according to the technology described in aforementioned Patent Document 1, because each electric motor is allocated on the opposite side of the windshield from their respective wiper shafts, i.e., out of a windshield projection area, each electric motor is allocated so as to protrude into an engine compartment of a vehicle with an engine mounted in a front side. Therefore, an allocation space of each electric motor is needed in the engine compartment, so that there has been a limit to an improvement of the degree of freedom of design on the vehicle side.

An object of the present invention is to provide a wiper apparatus which can make the allocation space inside the engine compartment smaller.

The wiper apparatus of the present invention is a wiper apparatus which wipes off adhesive substances adhering to a windshield of a vehicle, comprising a first wiper motor having a first output shaft; first pivot holder allocated on one side of a side portion of the vehicle; a first pivot shaft rotatably supported by the first pivot holder; a first frame member provided between the first wiper motor and the first pivot holder, and supporting the first wiper motor and the first pivot holder; a first link rod provided between the first output shaft and the first pivot shaft, and conveying a rotation of the first output shaft to the first pivot shaft; a first wiper arm attached to the first pivot shaft; a first wiper blade mounted on the first wiper arm, and wiping the windshield; a second wiper motor having a second output shaft; a second pivot holder allocated on the other side of the side portion of the vehicle; a second pivot shaft rotatably supported by the second pivot holder; a second frame member provided between the second wiper motor and the second pivot holder, and supporting the second wiper motor and the second pivot holder; a second link rod provided between the second output shaft and the second pivot shaft, and conveying a rotation of the second output shaft to the second pivot shaft; a second wiper arm attached to the second pivot shaft; and a second wiper blade mounted on the second wiper arm, and wiping the windshield, wherein the first wiper motor and the second wiper motor are respectively allocated in an inside of a projection area of the windshield further inward in an inside of a cabin of the vehicle than the first pivot holder and the second pivot holder.

The wiper apparatus of the present invention is that the first wiper motor and the second wiper motor are the reversible motors which respectively rotate the first output shaft and the second output shaft in the positive and the negative directions within predetermined angle ranges.

The wiper apparatus of the present invention is that the first link rod and the second link rod are respectively allocated to point towards an inside of the vehicle.

According to the present invention, because the first wiper motor and the second wiper motor are respectively arranged within the projection area of the windshield into the cabin of the vehicle in comparison with the first pivot holder and the second pivot holder, each wiper motor can be allocated inside the cabin without protruding inside the engine compartment et al. Because the location space in the engine compartment et al. can be made smaller, a degree of freedom of design on the vehicle side can be further improved.

According to the present invention, because the first wiper motor and the second wiper motor are the reversible motors which respectively rotate the first output shaft and the second output shaft in the positive and negative directions within the predetermined angle ranges, a movable range of a movable portion driven by each wiper motor can be minimized. Therefore, the allocation spaces of the wiper apparatuses can be made smaller.

According to the present invention, because the first link rod and the second link rod are respectively arranged to point toward the inside of the vehicle, the wiper apparatuses can be allocated close to the side portions of the vehicle by allocating the movable portion driven by each wiper motor inside the vehicle. Therefore, a relatively large space can be secured inside the vehicle, which results in making it possible to form a sufficiently sized impact absorbing volume ("crushable zone").

BRIEF DESCRIPTIONS OF THE DRAWINGS

DESCRIPTIONS OF THE PREFERRED EMBODIMENTS

Hereinafter, a detailed explanation will be made on an embodiment of a wiper apparatus according to the present invention with reference to the drawings.

Figure 1:
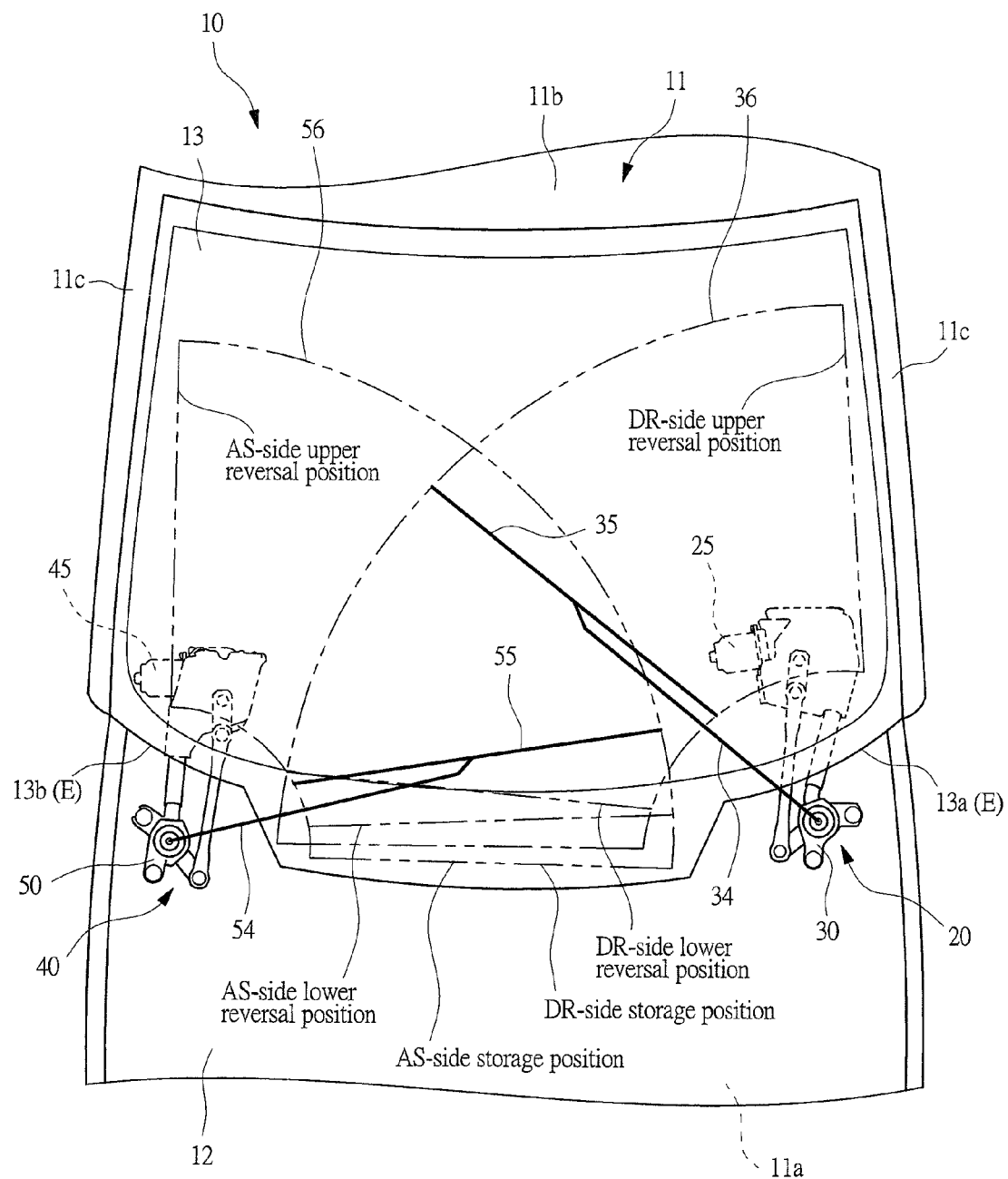
FIG. 1 is a front view showing a portion of a vehicle equipped with a wiper apparatus according to the present invention.
Figure 2:
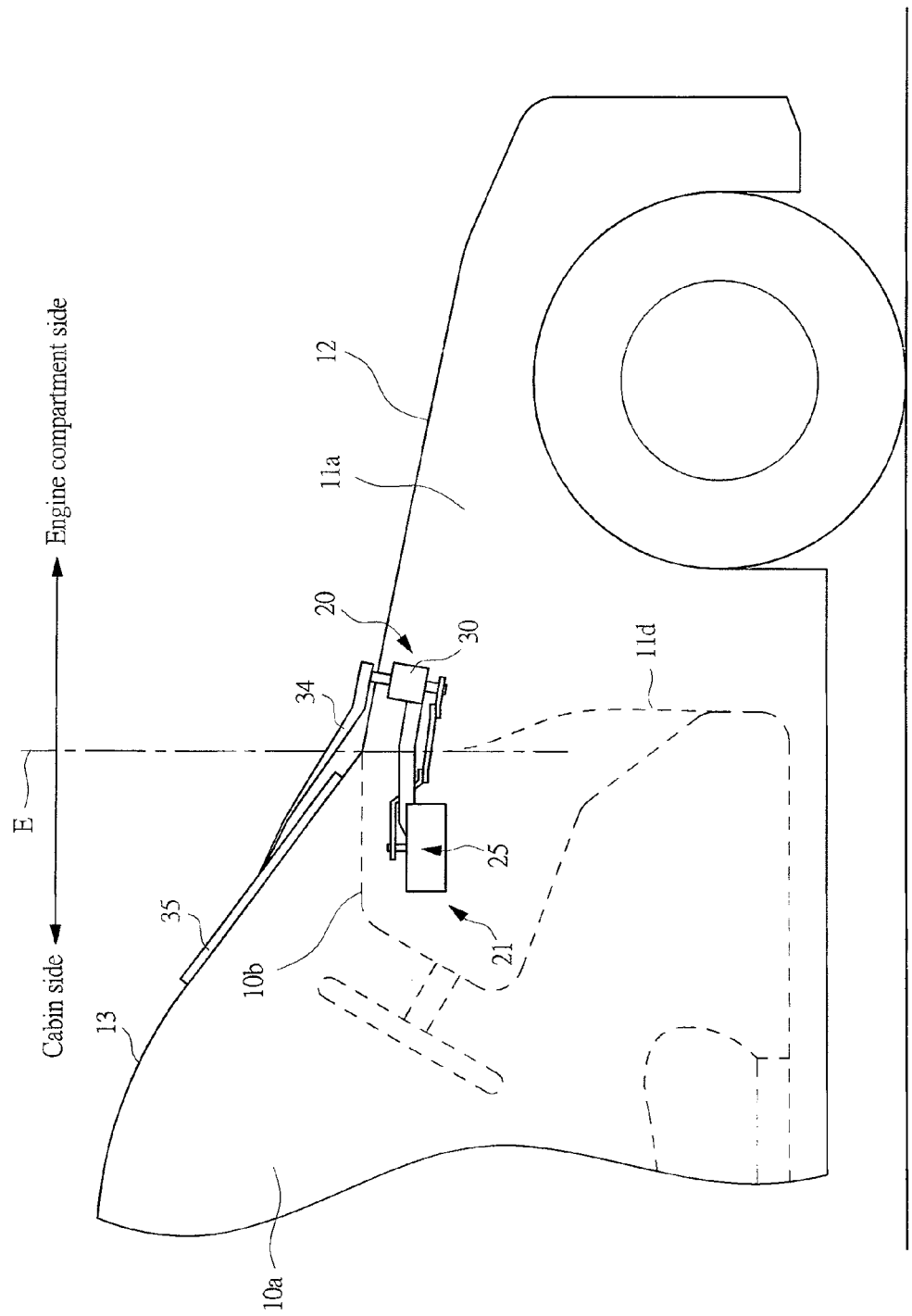
FIG. 2 is a side view in which a portion of the vehicle equipped with the wiper apparatus of FIG. 1 is viewed from its side face.
Figure 3:
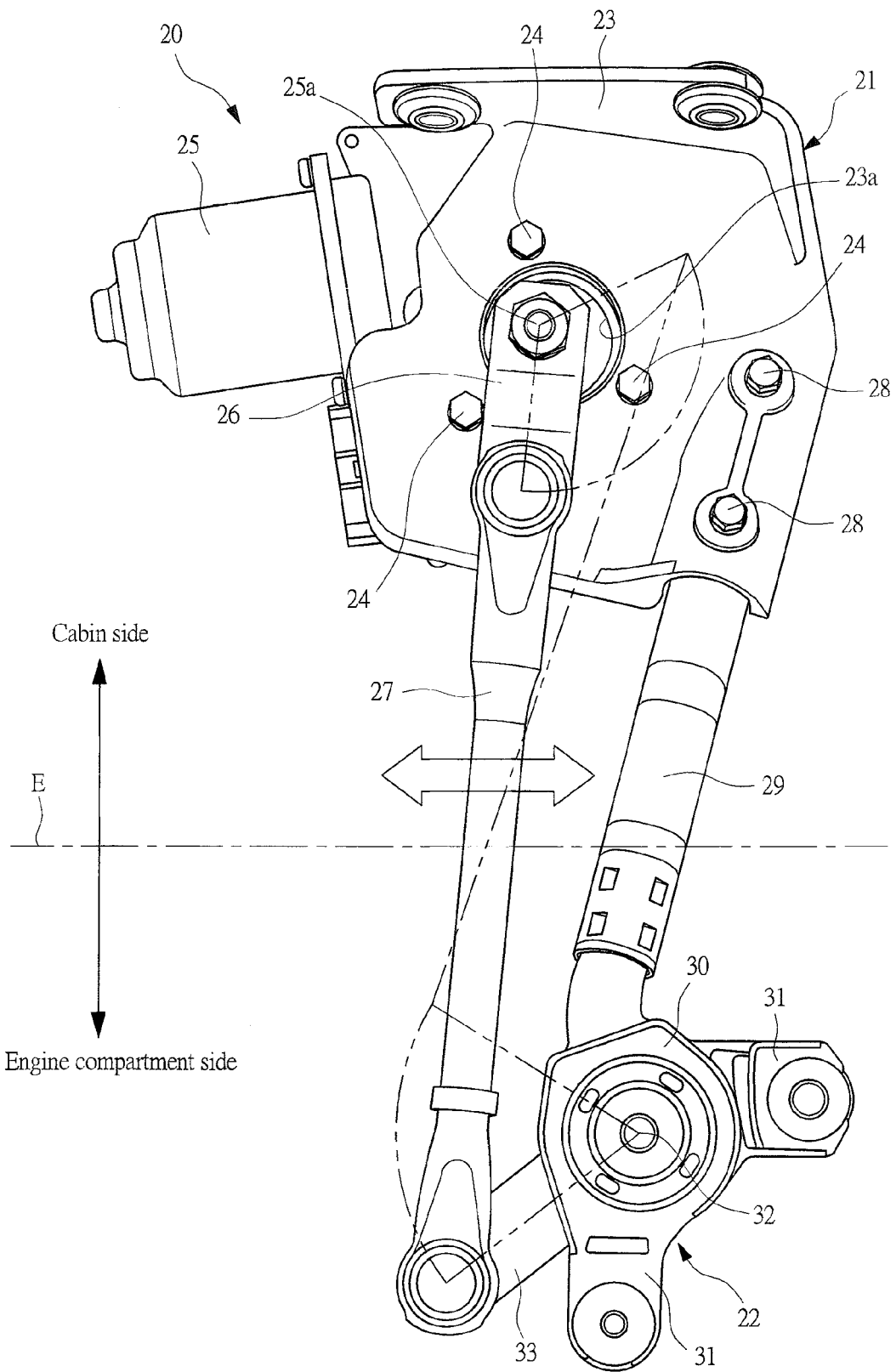
FIG. 3 is an explanatory view explaining a configuration of a DR-side of the wiper apparatus.
Figure 4:
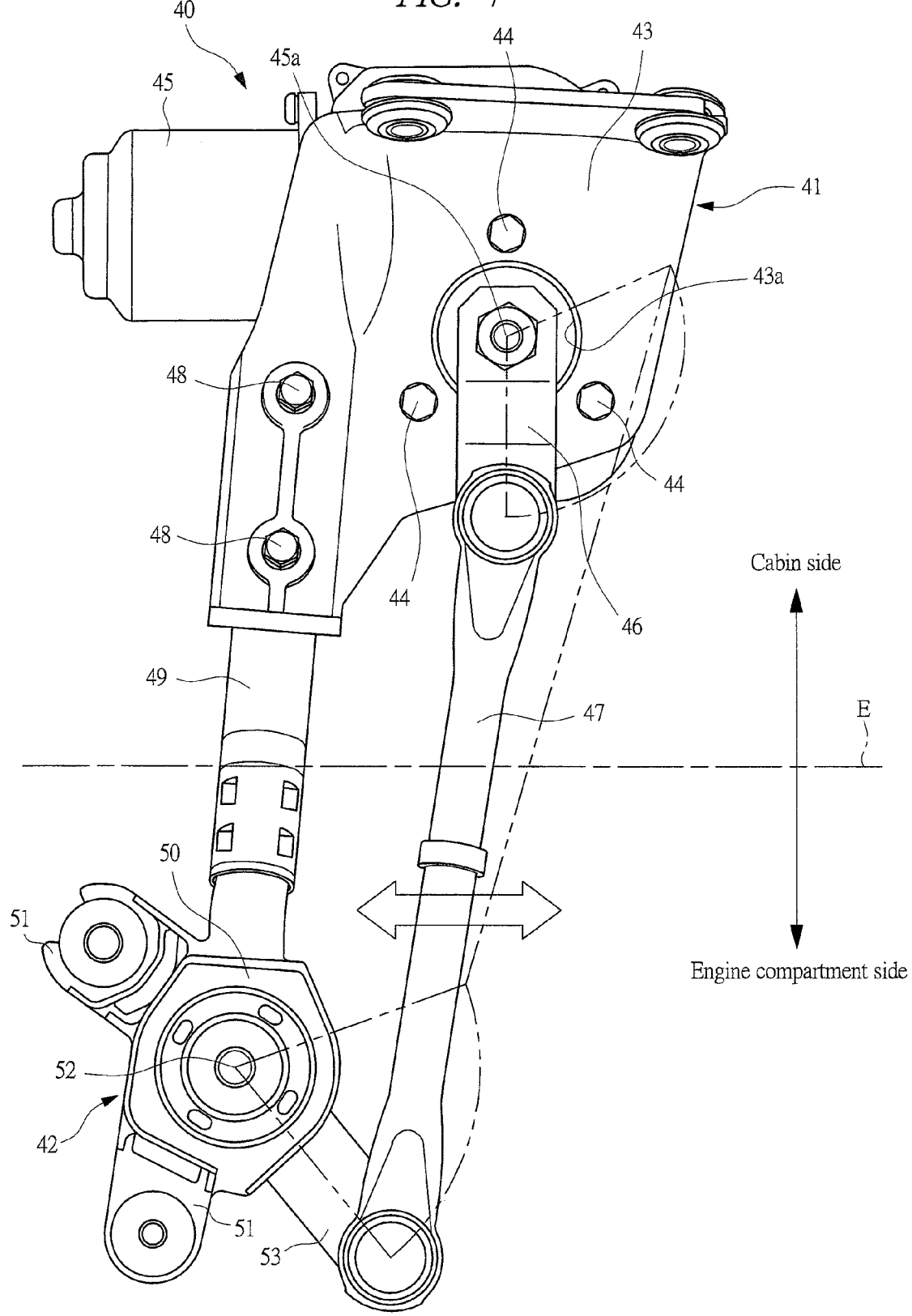
FIG. 4 is an explanatory view explaining a configuration of an AS-side of the wiper apparatus.

FIG. 1 is a front view showing a portion of a vehicle equipped with the wiper apparatus according to the present invention; FIG. 2 is a side view in which a portion of the vehicle equipped with the wiper apparatus of FIG. 1 is viewed from its side face; FIG. 3 is an explanatory view of explaining a configuration of a DR-side of the wiper apparatus; and FIG. 4 is an explanatory view of explaining a configuration of an AS-side of the wiper apparatus.

As shown in FIG. 1 and FIG. 2, a vehicle 10 has a body portion 11 constituting an outer shell of the vehicle 10, and an engine hood portion 12 which opens and closes an engine compartment 11a formed on a front side of the body portion 11. The body portion 11 comprises a roof portion 11b, and front pillar portions 11c forming a pair on a left side and a right side of the vehicle 10, and the roof portion 11b and each front pillar portion 11c together support a front glass (windshield) 13 via a mold (resin-made window frame) not shown.

On a left side and a right side of a portion of the front glass 13 close to the engine compartment 11a (lower portion of FIG. 1), a right edge portion 13a and a left edge portion 13b are formed. By the right edge portion 13a and the left edge portion 13b, a boundary portion E is formed between a cabin 10a, which is formed inside the roof portion 11b and each front pillar portion 11c, and the engine compartment 11a, which is covered by the engine hood portion 12. And approximately directly below the boundary portion E, a bulkhead 11d is provided as a wall portion which partitions the engine compartment 11a and the cabin 10a, as shown in FIG. 2.

To the right edge portion 13a and the left edge portion 13b of the front glass 13, a driver-seat-side (DR-side) wiper apparatus 20 and a passenger-seat-side (AS-side) wiper apparatus 40 are respectively located in proximity to each other.

As shown in FIG. 3, the DR-side wiper apparatus 20 has a DR-side motor portion 21 and a DR-side pivot portion 22. The DR-side motor portion 21 comprises a DR-side bracket 23 which is fixed to the body portion 11, and a DR-side wiper motor (first wiper motor) 25 is fixed to this DR-side bracket 23 by a plurality of bolts 24 (three bolts in Figures). A through-hole 23a is provided in an approximate center portion of the DR-side bracket 23, and a DR-side output shaft (first output shaft) 25a of the DR-side wiper motor 25 penetrates through this through-hole 23a.

One end side of a DR-side motor link 26 is fixed to a protruding end of the DR-side output shaft 25a, and this DR-side motor link 26 rotates in conjunction with a rotation of the DR-side output shaft 25a. One end side of a DR-side link rod (first link rod) 27 is rotatably connected to the other end side of the DR-side motor link 26 via a ball joint (not shown), and this DR-side link rod 27 is swingable in up-down and left-right directions with respect to the DR-side motor link 26 within a predetermined angle range.

One end side of a cylindrical DR-side frame member (first frame member) 29 is fixed to the DR-side bracket 23 by a plurality of bolts 28 (two bolts in Figures), and this DR-side frame member 29 is allocated in a side portion side (fender or door side) of the vehicle 10 in a mounted condition of the DR-side wiper apparatus 20 to the vehicle 10.

A DR-side pivot holder (first pivot holder) 30 is fixed to the other end side of the DR-side frame member 29 by caulking et al. A pair of leg portions 31 is provided integrally with this DR-side pivot holder 30, and by each leg portion 31, the DR-side pivot holder 30 is fixed to the body portion 11 of a side portion located on one side (DR side) of the vehicle 10.

A DR-side pivot shaft (first pivot shaft) 32 is supported rotatably by the DR-side pivot holder 30. One end side of a DR-side pivot link 33 is fixed to one end side (rear side of Figure) of this DR-side pivot shaft 32, and this DR-side pivot link 33 rotates in conjunction with the DR-side pivot shaft 32 at a position of avoiding contacting with each leg portion 31.

The other end side of the DR-side link rod 27 is connected rotatably to the other end side of the DR-side pivot link 33 via a ball-joint (not shown), and the DR-side link rod 27 is swingable in up-down and left-right directions also with respect to the DR-side pivot link 33 within the predetermined angle range.

The DR-side frame member 29 and the DR-side link rod 27 are allocated approximately parallel to each other, and the DR-side frame member 29 supports the DR-side wiper motor 25 and the DR-side pivot holder 30 via the DR-side bracket 23. The DR-side link rod 27 is a movable portion which conveys the rotation of the DR-side output shaft 25a of the DR-side wiper motor 25 to the DR-side pivot shaft 32, and points connecting respective members follow a locus shown by double-dot lines in Figures. The DR-side link rod 27 is allocated inside the vehicle 10 (on an engine compartment 11a side) in a mounted condition of the DR-side wiper apparatus 20 to the vehicle 10, and is swung (as shown by a blank arrow in Figures) according to an actuation of the DR-side wiper motor 25.

One end side of a DR-side wiper arm (first wiper arm) 34 is fixed, as shown in FIG. 1, to the other end side (front side in Figures) of the DR-side pivot shaft 32, and this DR-side wiper arm 34 moves swingably within a predetermined angle range according to rotation of the DR-side pivot shaft 32. A DR-side wiper blade (first wiper blade) 35 is mounted on the other end side of the DR-side wiper arm 34, and this DR-side wiper blade 35 performs wiping motion, within a DR-side wiping area 36 between a DR-side upper reversal position and a DR-side lower reversal position over the front glass 13 shown in FIG. 1, according to swinging motion of the DR-side wiper arm 34.

The DR-side wiper motor 25 of the DR-side wiper apparatus 20 is, as shown in FIG. 2, inside the cabin 10a and farther from the boundary portion E than the DR-side pivot holder 30, and allocated in an inner space of an instrument panel 10b in the cabin 10a. Thereby, the DR-side wiper motor 25 is allocated within the projection area of the front glass 13 (dotted line in FIG. 1).

The DR-side pivot holder 30 of the DR-side wiper apparatus 20 is allocated on a side of the engine compartment 11a with respect to the boundary portion E, and as shown in FIG. 2, the DR-side wiper arm 34 is extended over the front glass 13 along inclination of the front glass 13 so as to be bridged over the DR-side wiper motor 25.

As shown in FIG. 4, the AS-side wiper apparatus 40 has an AS-side motor portion 41 and an AS-side pivot portion 42. The AS-side motor portion 41 comprises an AS-side bracket 43 which is fixed to the body portion 41, and an AS-side wiper motor (second wiper motor) 45 is fixed to this AS-side bracket 43 by a plurality of bolts 44 (three bolts in Figures). In an approximate center portion of the AS-side bracket 43, a through-hole 43a is provided, and an AS-side output shaft (second output shaft) 45a of the AS-side wiper motor 45 penetrates through this through-hole 43a.

One end side of an AS-side motor link 46 is fixed to a protruding end of the AS-side output shaft 45a, and this AS-side motor link 46 rotates according to rotation of the AS-side output shaft 45a. One end side of an AS-side link rod (second link rod) 47 is rotatably connected to the other end side of the AS-side motor link 46 via the ball joint (not shown), and this AS-side link rod 47 is swingable in up-down and left-right directions with respect to the AS-side motor link 46 within a predetermined angle range.

One end side of a cylindrical AS-side frame member (second frame member) 49 is fixed to the AS-side bracket 43 by a plurality of bolts 48 (two bolts in Figures), and this AS-side frame member 49 is allocated to the side portion side (fender or door side) of the vehicle 10 in a mounted condition of the AS-side wiper apparatus 40 to the vehicle 10.

An AS-side pivot holder (second pivot holder) 50 is fixed to the other end side of the AS-side frame member 49 by a caulking et al. A pair of leg portions 51 is provided integrally with this AS-side pivot holder 50, and by each leg portion 51, the AS-side pivot holder 50 is fixed to the body portion 11 of a side portion located on the other side (AS-side) of the vehicle 10.

An AS-side pivot shaft (second pivot shaft) 52 is rotatably supported by the AS-side pivot holder 50. One end side of the AS-side pivot link 53 is fixed to one end side (rear side in Figures) of the AS-side pivot shaft 52, and this AS-side pivot link 53 rotates in conjunction with the AS-side pivot shaft 52 at a position of avoiding contacting with each leg portion 51.

The other end side of the AS-side link rod 47 is rotatably connected to the other end side of the AS-side pivot link 53 via a ball joint (not shown), and the AS-side link rod 47 is swingable in up-down and left-right directions within a predetermined angle range also with respect to the AS-side pivot link 53.

The AS-side frame member 49 and the AS-side link rod 47 are allocated to be approximately parallel to each other, and the AS-side frame member 49 supports the AS-side wiper motor 45 and the AS-side pivot holder 50 via the AS-side bracket 43. The AS-side link rod 47 is a movable portion which conveys the rotation of the AS-side output shaft 45a of the AS-side wiper motor 45 to the AS-side pivot shaft 52, and points connecting respective members follow a locus shown by double-dot lines in Figures. The AS-side link rod 47 is allocated inside the vehicle 10 (engine compartment 11a side) in the mounted condition of the AS-side wiper apparatus 40 to the vehicle 10, and is swung (as shown by the blank arrow in Figures) according to an actuation of the AS-side wiper motor 45.

One end side of an AS-side wiper arm (second wiper arm) 54 is fixed, as shown in FIG. 1, to the other end side (front side in Figures) of the AS-side pivot shaft 52, and this AS-side wiper arm 54 moves swingably within the predetermined angle range according to rotation of the AS-side pivot shaft 52. An AS-side wiper blade (second wiper blade) 55 is mounted on the other end side of the AS-side wiper arm 54, and this AS-side wiper blade 55 performs a wiping motion within an AS-side wiping area 56 between an AS-side upper reversal position and an AS-side lower reversal position over the front glass 13 as shown in FIG. 1 according to a swinging motion of the AS-side wiper arm 54.

The AS-side wiper motor 45 of the AS-side wiper apparatus 40 is, as with the DR-side wiper motor 25, provided inside the cabin 10a and farther from the boundary portion E than the AS-side pivot holder 50, and allocated inside the inner space of the instrument panel 10b in the cabin 10a. Thereby, the AS-side wiper motor 45 is allocated within the projection area of the front glass 13 (dotted line in FIG. 1).

The AS-side pivot holder 50 of the AS-side wiper apparatus 40 is, as with the DR-side pivot holder 30, allocated on the side of the engine compartment 11a with respect to the boundary portion E, and the AS-side wiper arm 54 is extended over the front glass 13 along the inclination of the front glass 13 so as to be bridged over the AS-side wiper motor 45.

Next, actuations of the DR-side wiper apparatus 20 and the AS-side wiper apparatus 40, each of which has an aforementioned constitution, will be described.

In order to actuate the respective wiper apparatuses 20 and 40, first, an operator switches on a wiper switch (not shown) provided on the instrument panel 10b et al. Then, a driving current is supplied to the respective wiper motors 25 and 45 via a controller (not shown). When the driving current is supplied to the respective wiper motors 25 and 45, the respective wiper motors 25 and 45 are rotatably controlled in a predetermined rotation direction and by a predetermined rotation speed, whereby the respective output shafts 25a and 45a are rotatably driven via reduction mechanisms (not shown). By driving rotatably the respective output shafts 25a and 45a, the rotation of the respective output shafts 25a and 45a are conveyed to the respective pivot shafts 32 and 52 via the respective link rods 27 and 47, and as a result, the respective wiper blades 35 and 55 perform wiping motions inside the respective wiping areas 36 and 56 to wipe raindrops et al. adhering to the front glass 13.

Here, for the respective wiper motors 25 and 45, so-called reversible motors, each of which rotates in forward and backward directions within the predetermined angle area, are adopted, and the respective wiper blades 35 and 55 make reversal motions at the upper reversal position and the lower reversal position based on position information of the respective wiper blades 35 and 55 with respect to the front glass 13. For position control of the respective wiper blades 35 and 55 with respect to the front glass 13, absolute position detection sensors (not shown) which detect absolute positions of the respective output shafts 25a and 45a, and relative position detection sensors (not shown) which detect relative positions of the respective wiper motors 25 and 45 are used. In other words, by detecting the position information of the respective output shafts 25a and 45a and the rotation information of the respective wiper motors 25 and 45, positions of the respective wiper blades 35 and 55 with respect to the front glass 13 can be obtained. Incidentally, as each detection sensor, a magnetic detection sensor utilizing, for example, an MR sensor or a Hall-effect IC can be used.

Then, by turning the wiper switch off in order to halt the wiping motions with respect to the front glass 13 by the respective wiper blades 35 and 55, the controller detects the positions of the respective wiper blades 35 and 55 with respect to the front glass 13 by the respective detection sensors, stores the wiper blades 35 and 55 respectively to a DR-side stored position and an AS-side stored position which are shown in FIG. 1, and then terminates the supply of the driving current to the respective wiper motors 25 and 45.

As described above in detail, according to the wiper apparatus according to the present embodiment, since the DR-side wiper motor 25 and the AS-side wiper motor 45 are respectively disposed within the projection area of the front glass 13 inside the cabin 10a of the vehicle 10 with respect to the DR-side pivot holder 30 and the AS-side pivot holder 50, the respective wiper motors 25 and 45 can be allocated inside the cabin 10a without protruding into the engine compartment 11a. Since the allocation spaces of the respective wiper apparatuses 20 and 40 can be made smaller, improving the degree of freedom of design on the vehicle 10 side is possible.

Also, according to the wiper apparatus according to the present embodiment, since the DR-side wiper motor 25 and the AS-side wiper motor 45 are made reversible motors which rotate the DR-side output shaft 25a and the AS-side output shaft 45a respectively in the forward and backward directions within the predetermined angle ranges, the movable ranges of the respective link rods 27 and 47 driven respectively by the wiper motors 25 and 45 can be minimized. Therefore, the allocation spaces of the respective wiper apparatuses 20 and 40 can be made smaller.

Further, according to the wiper apparatus according to the present embodiment, since the DR-side link rod 27 and the AS-side link rod 47 are disposed so as to point towards the inside of the vehicle 10, the respective link rods 27 and 47 driven respectively by the wiper motors 25 and 45 can be allocated inside the vehicle 10, and the respective wiper apparatuses 20 and 40 can be allocated close to the side portion of the vehicle 10. Therefore, a relatively large space can be secured inside the vehicle 10 to form a sufficiently large impact absorbing space ("crushable zone").

Needless to say, the present invention is not limited to the above described embodiment, and may be variously modified within a scope of not departing from the gist thereof. For example, in the above described embodiment, the respective wiper apparatuses 20 and 40 are disposed so that the respective link rods 27 and 47 which constitute the respective wiper apparatuses 20 and 40 are allocated to be approximately straight along the forward-backward direction of the vehicle 10. However, the present invention is not limited as such, and may have a structure in which, depending on the allocating space on the vehicle 10 side, for example, the respective wiper apparatuses 20 and 40 are disposed inclining with respect to the vehicle 10 so that the respective wiper motors 25 and 45 are in the proximity.

Also, in the above described embodiment, the respective wiper motors 25 and 45 having the reduction mechanisms are adopted. However, the present invention is not limited as such, and the rotation shafts of each wiper motors may be used as output shafts, thereby directly driving the respective motor links 26 and 46.

Further, in the above described embodiment, the respective wiper motors 25 and 45 are presented to be the reversible motors which rotates in the forward and backward directions within the predetermined angle ranges. However, the present invention is not limited as such, and the present invention may have a structure in which a single unidirectional wiper motor is adopted, and a linking mechanism is provided inside the cabin 10a to cause each wiper blade to perform a wiping motion.

Still further, in the above described embodiment, the respective link rods 27 and 47 as movable members are allocated to point towards the inside of the vehicle 10. However, the present invention is not limited as such, and the respective frame members 29 and 49 which constitute the respective wiper apparatus 20 and 40 may be allocated so as to point towards the inside of the vehicle 10.

What is claimed is:

1. A wiper apparatus which wipes off adhesive substances adhering to a windshield of a vehicle which has a body portion constituting an outer shell of the vehicle, comprising:
    a first wiper motor having a first output shaft and allocated on a side of a left side portion of the vehicle;
    a first pivot holder allocated on the side of the left side portion of the vehicle, the first pivot holder having a pair of leg portions fixed to the body portion of the vehicle, one of the leg portions extending toward the left side portion of the vehicle, the other of the leg portions extending along the left side portion of the vehicle;
    a first pivot shaft rotatably supported by the first pivot holder;
    a first frame member supporting the first wiper motor and the first pivot holder;
    a first link rod provided between the first output shaft and the first pivot shaft, and conveying a rotation of the first output shaft to the first pivot shaft;
    a first wiper arm attached to the first pivot shaft;
    a first wiper blade mounted on the first wiper arm, and wiping the windshield;
    a second wiper motor having a second output shaft and allocated on a side of a right side portion of the vehicle;
    a second pivot holder allocated on the side of the right side portion of the vehicle, the second pivot holder having a pair of leg portions fixed to the body portion of the vehicle, one of the leg portions extending toward the right side portion of the vehicle, the other of the leg portions extending along the right side portion of the vehicle;
    a second pivot shaft rotatably supported by the second pivot holder;
    a second frame member supporting the second wiper motor and the second pivot holder;
    a second link rod provided between the second output shaft and the second pivot shaft, and conveying a rotation of the second output shaft to the second pivot shaft;
    a second wiper arm attached to the second pivot shaft; and
    a second wiper blade mounted on the second wiper arm and wiping the windshield,
    wherein the first wiper motor and the second wiper motor are respectively arranged within a projection area of the windshield into a cabin of the vehicle in comparison with the first pivot holder and the second pivot holder,
    the first frame member is allocated close to the left side portion of the vehicle, and between the first link rod and the left side portion of the vehicle,
    the second frame member is allocated close to the right side portion of the vehicle, and between the second link rod and the right side portion of the vehicle,
    the first link rod and the second link rod are allocated to point toward an inside of the vehicle.

2. The wiper apparatus according to claim 1, wherein the first wiper motor and the second wiper motor are reversible motors which respectively rotate the first output shaft and second output shaft in positive and negative directions within predetermined angle ranges.

3. The wiper apparatus according to claim 1, further comprising:
    a first pivot link having one end fixed to the first pivot shaft and the other end rotatably connected to the first link rod, wherein the pivot link is pivotally movable together with the first pivot shaft within a first operating area which is closer to the center side of the vehicle than the first pivot shaft; and
    a second pivot link having one end fixed to the second pivot shaft and the other end rotatably connected to the second link rod, wherein the pivot link is pivotally movable together with the second pivot shaft within a second area which is closer to the center side of the vehicle than the second pivot shaft.

4. A wiper apparatus which wipes off adhesive substances adhering to a windshield of a vehicle which has a body portion constituting an outer shell of the vehicle, comprising: a left side wiper unit allocated in the vicinity of a left side wall of the vehicle, and the right side wiper unit allocated in the vicinity of a right side wall of the vehicle, wherein the left side wiper unit including:
- a first wiper motor having a first output shaft;
- a first pivot holder having at least one leg portion fixed to the body portion of the vehicle;
- a first bracket;
- a first pivot shaft rotatably supported by the first pivot holder;
- a first frame member supporting the first wiper motor and the first pivot holder via the first bracket;
- a first link rod provided between the first output shaft and the first pivot shaft, and conveying a rotation of the first output shaft to the first pivot shaft;
- a first wiper arm attached to the first pivot shaft; and
- a first wiper blade mounted on the first wiper arm, and wiping the windshield, and the right side wiper unit including:
- a second wiper motor having a second output shaft;
- a second pivot holder having at least one leg portion fixed to the body portion of the vehicle;
- a first bracket;
- a second pivot shaft rotatably supported by the second pivot holder;
- a second frame member supporting the second wiper motor and the second pivot holder via the second bracket;
- a second link rod provided between the second output shaft and the second pivot shaft, and conveying a rotation of the second output shaft to the second pivot shaft;
- a second wiper arm attached to the second pivot shaft; and
- a second wiper blade mounted on the second wiper arm and wiping the windshield, wherein the first bracket has:
a first flat portion perpendicular to the first pivot shaft,
a first left side portion which extends along the left side wall of the vehicle and is fixed to the first frame member, and
a first flange portion inclined with respect to the first flat portion and fixed to the body portion of the vehicle so as to face a cabin of the vehicle;

wherein the second bracket has:
a second flat portion perpendicular to the second pivot shaft,
a second right side portion which extends along the right side wall of the vehicle and is fixed to the second frame member, and
a second flange portion inclined with respect to the second flat portion and fixed to the body portion of the vehicle so as to face the cabin of the vehicle;

wherein the first wiper motor and the second wiper motor are arranged within a projection area of the windshield into the cabin of the vehicle in comparison with the first pivot holder and the second pivot holder, the first frame member is allocated close to the left side wall of the vehicle, and between the first link rod and the left side wall of the vehicle, the second frame member is allocated close to the right side wall of the vehicle, and between the second link rod and the right side portion of the vehicle, the first link rod and the second link rod are allocated to point toward an inside of the vehicle.

\* \* \* \* \*